Figure 5:
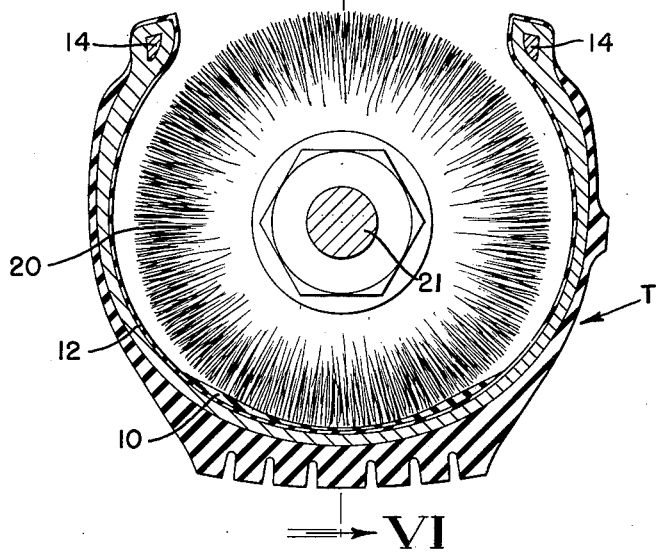

Aug. 7, 1962 G. R. CUTHBERTSON ETAL 3,048,211
METHOD FOR BALANCING PNEUMATIC TIRES AND
THE ARTICLE PRODUCED THEREBY
Filed Oct. 10, 1957 3 Sheets-Sheet 1
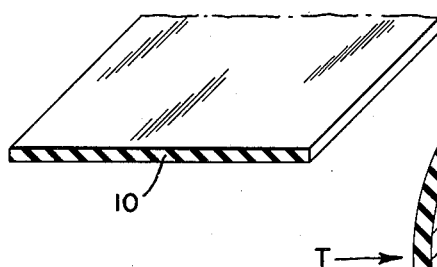
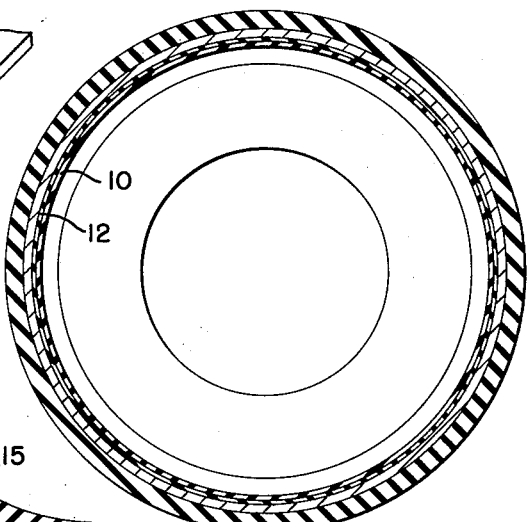
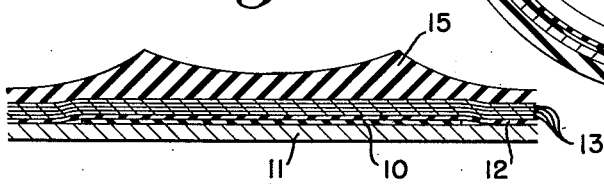
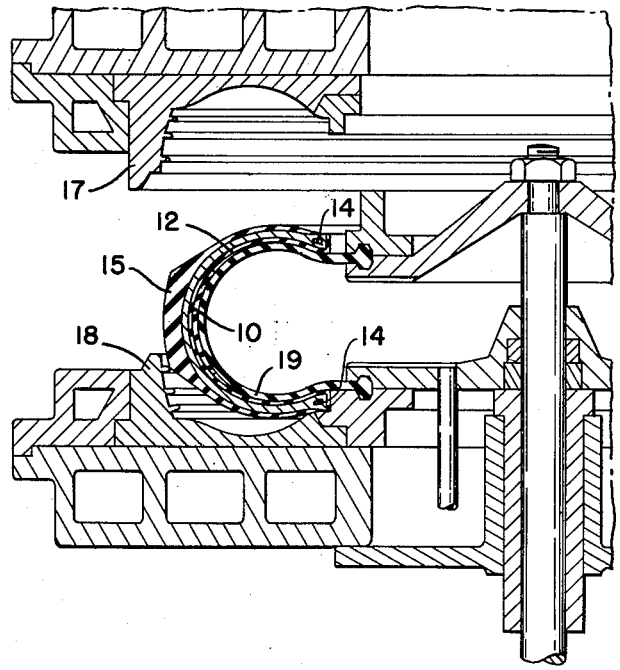
INVENTOR.
GEORGE R. CUTHBERTSON
CARL F. ENGSTROM
BY
Irwin M. Lewis
ATTORNEY.

Aug. 7, 1962  G. R. CUTHBERTSON ETAL  3,048,211
METHOD FOR BALANCING PNEUMATIC TIRES AND
THE ARTICLE PRODUCED THEREBY
Filed Oct. 10, 1957  3 Sheets-Sheet 2

INVENTOR.
GEORGE R. CUTHBERTSON
CARL F. ENGSTROM
BY
Irwin M. Lewis
ATTORNEY.

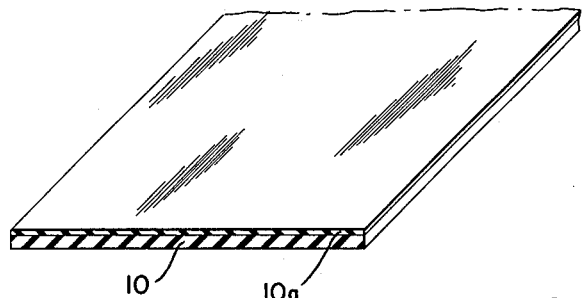
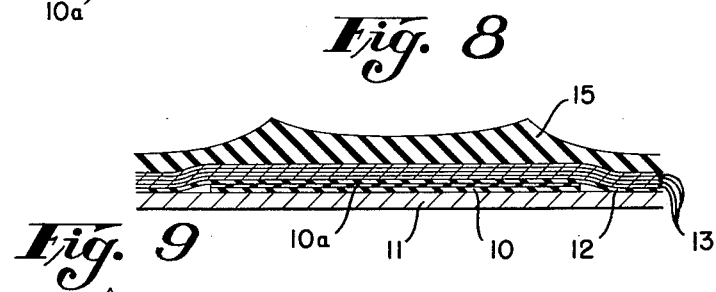
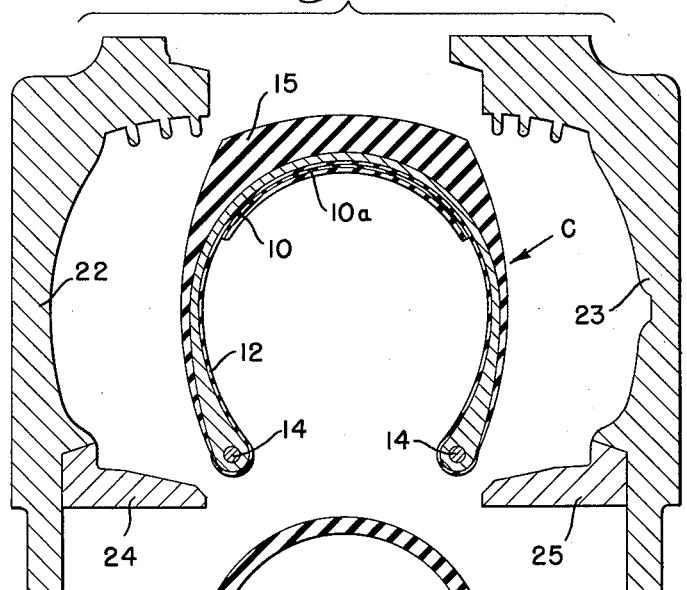
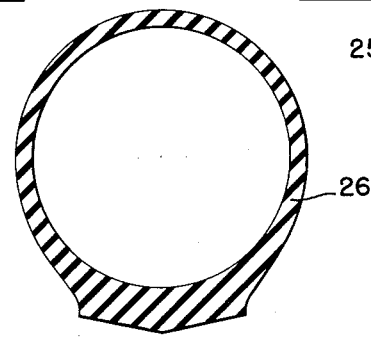

United States Patent Office 3,048,211
Patented Aug. 7, 1962

3,048,211
METHOD FOR BALANCING PNEUMATIC TIRES AND THE ARTICLE PRODUCED THEREBY
George R. Cuthbertson, Ridgewood, N.J., and Carl F. Engstrom, Detroit, Mich., assignors to United States Rubber Company, New York, N.Y., a corporation of New Jersey
Filed Oct. 10, 1957, Ser. No. 689,398
8 Claims. (Cl. 152—330)

This invention relates to a method for balancing pneumatic tires, and to the article produced thereby.

The proper balancing of pneumatic tires, while always desirable, is now a vastly more important phase of tire manufacture because of the relatively high speeds at which motor vehicles are operated. It is imperative that the tires be balanced within a specified limit of inch ounces to assure proper and maximum performance of the tire and safety of the fast moving vehicles.

Heretofore various means have been employed in an attempt to balance tires, such as the fixing of weights to the rim of the wheel, and the application of balance dough to the inside of the tire in the crown area at the light spot. The use of weights on the wheel rim is objectionable, because they are unsightly, relatively expensive, and have a tendency to become displaced and also require relocation when the positions of the tires are rotated. The use of balance dough on the interior of the tire at the light spot in tire and tube assemblies provides a satisfactory solution in most cases, but is unsatisfactory in tubeless tires, unless applied with extreme care and under controlled conditions. Moreover, in tubeless tires the balance dough may become displaced because there is no tube to assist in holding the balance dough in place.

The principal object of the present invention is to provide an improved method and apparatus to facilitate the balancing of pneumatic tires without the use of objectionable extraneous means heretofore employed.

A further object of the invention is to provide an improved method and apparatus for balancing pneumatic tires of the tubeless type.

Another object of the invention is to provide a method and apparatus for balancing pneumatic tires in which the balancing means constitutes an integral or permanent part of the tire structure so that the balanced tire may be handled as a unit and wherein the balanced tire is not subject to subsequent unbalance by reason of the displacement or misplacement of the balancing means.

The present invention accomplishes the foregoing objects, and other objects and advantages, by the use of a high gravity balancing or buffing strip composed of rubber or other resilient type material extending circumferentially around the inner crown area of the tire and secured thereto when the tire is cured, either by vulcanization or other type of adhesion. The balancing of the tire is effected by first locating the heavy spot therein and then removing, at the appropriate area or spot, a sufficient amount of the balancing or buffing strip, as for instance by a buffing wheel or the like, to thus lighten the tire at this point to bring the tire into correct balance. The buffing or balancing strip is buffed or reduced in thickness only in the appropriate area and to the extent necessary to effect the desired balance, and the remainder of the buffing strip remains untouched. In as much as the balancing or buffing strip is permanently joined to the tire by vulcanization or otherwise, it becomes a unitary part thereof so that when the tire is once properly balanced, it needs no further attention in this respect.

While the high gravity balancing or buffing strip may be made of any color, it is preferably made of a color different from that of the surface of the tire to which it is attached so that if, during the buffing or balancing operation, the strip is completely buffed off, the adjacent inner surface of the tire will become exposed, and being of a different color, will act as a warning signal to discontinue the buffing operation, which if continued would expose the tire cords or impair the liner of a tubeless tire, either of which could result in ply separation and air leakage.

The present invention also contemplates, as a modification thereof, the use of a thin layer of rubber or other material interposed between the balancing or buffing strip and the inner crown surface of the tire, this thin strip being of a color different from the balancing or buffing strip which, when exposed by excessive buffing, will act as a visual signal that the buffing operation should be discontinued.

The invention further contemplates, as a modification thereof, the use of a special curing bag provided with a circumferential recess in the outer crown area thereof to receive and accommodate the balancing or buffing strip during the shaping and vulcanizing of the tire to prevent displacement of the underlying liner or tire stock which might occur during vulcanization due to the added thickness of the balancing or buffing strip.

Various other objects and advantages of this invention will become more apparent as this description proceeds, especially when considered in connection with the accompanying drawings, wherein:

FIG. 1 is a fragmentary perspective view of the high gravity rubber buffing or balancing strip adapted to be secured to the inner crown area of the tire, FIG. 2 is a circumferential sectional view of a shaped and vulcanized tire casing showing the buffing strip applied and integrated therewith in accordance with this invention, FIG. 3 is an enlarged partial sectional view of the tire components and balancing strip assembled on a conventional tire building drum, FIG. 4 is a fragmentary sectional view of a tire shaping and vulcanizing press with the shaped tire carcass therein and the mold parts about to be closed, FIG. 5 is a transverse sectional view of a cured tire casing constructed in accordance with this invention with a buffing member in operative position within the tire casing.

Figure 6:
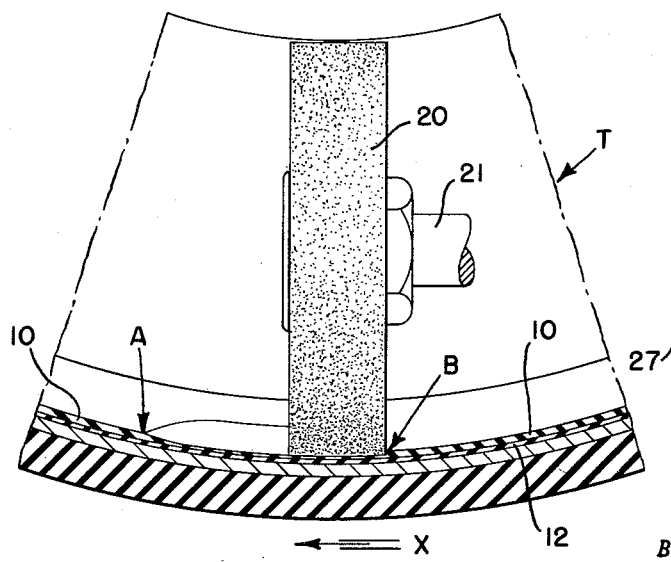
Figure 10:
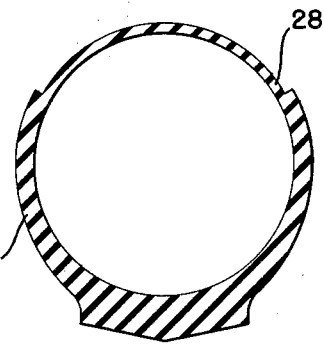

FIG. 6 is a partial circumferential sectional view of the tire casing shown in FIG. 5, showing the buffing member and a portion of the high gravity balancing strip removed, FIG. 7 is a fragmentary perspective view of a modification of the buffing or balancing strip shown in FIG. 1, in which the said strip has a separate visual warning strip associated therewith, FIG. 8 is a view similar to FIG. 3 showing the modified buffing or balancing strip assembled with the tire carcass components, FIG. 9 is a separated sectional view of another conventional type of tire mold and curing bag, with which either of the tire carcasses shown in FIGS. 3 and 8 may be cured, and FIG. 10 is a transverse sectional view of a modified form of curing bag adapted for use with the type of mold shown in FIG. 9.

Referring now to the drawings, and more particularly to FIGS. 1 to 4 thereof, it will be noted that the invention contemplates the use of a balancing or buffing strip 10 adapted to extend circumferentially of the tire and secured to the inner crown area thereof. This balancing or buffing strip is composed of high gravity material, such as natural rubber, synthetic rubber, a blend of natural and synthetic rubbers, or any other resilient type material capable of being bonded to the inner surface of the tire and buffed. This balancing strip 10 is usually made of 25 to 50 gage rubber stock and is preferably made of a color different from that of the adjacent wall of the tire to which it is attached. The stock is loaded with a filler so as to produce a relatively heavy or high gravity material. For the purpose of illustration, but not by way of limitation, the heavy gravity balancing or buffing strip 10 may be made according to the following formula:

| Material: | Parts by weight |
| --- | --- |
| Natural rubber | 50.00 |
| Oil Extended SBR | 68.75 |
| Blanc Fixe filler | 375.00 |
| Zinc oxide | 5.00 |
| Stearic acid | 2.00 |
| Red oxide | 2.00 |
| Red coloring | 1.70 |
| Accelerator | .90 |
| Sulfur | 2.25 |

As shown in FIG. 2, the balancing or buffing strip 10 extends completely around the inner crown area of the tire, and as shown in FIGS. 3 and 4 it may extend transversely of the tire to about the shoulder areas thereof.

In fabricating the tire the balancing strip 10 is first applied around the center of the conventional tire building drum 11, fragmentarily illustrated in FIG. 3. If the tire is a tubeless tire, the inner liner 12 is then applied to the drum and subsequently the tire carcass plies 13 are successively applied in the conventional manner, and the ends thereof are anchored around bead wire elements 14 (see FIG. 4), and subsequently the tread and sidewall portions 15 are applied, all in the conventional and well known manner, to produce a flat band tire carcass suitable for subsequent shaping and vulcanization in the shaping and vulcanizing press fragmentarily illustrated in FIG. 4, or the mold illustrated in FIG. 9.

The tire shaping and vulcanizing press shown fragmentarily in FIG. 4 is what is known in the art as a "Bag-O-Matic" type press. It comprises upper and lower mold halves 17 and 18 and a flexible radially expansible tubular member 19 adapted to be expanded within the tire carcass as the mold halves 17 and 18 approach one another to assist in shaping the tire and forcing the tire carcass into engagement with the cavity forced by the mold halves 17 and 18. The shaping and vulcanizing in "Bag-O-Matic" type presses is well known in the art, and needs no further description here.

The resulting shaped and vulcanized tire casing T is shown in FIGS. 2, 5 and 6. The balancing or buffing strip 10 has been integrated therewith during the shaping and vulcanizing of the tire. The completed tire is now ready for balancing.

If the tire is out of balance, the heavy spot on the tire is located and subjected to a buffing operation to remove a sufficient amount of the high gravity rubber balancing strip to bring the tire into balance.

This may be accomplished in any one of a number of ways, one of which is illustrated in FIGS. 5 and 6. As shown, the buffing may be accomplished by a rotatable buffing wheel 20 mounted on a shaft 21 driven by means not shown. The buffing wheel 20 may be formed of wire bristles or may be provided with any other type of abrasive surface, and is of a diameter sufficient to engage the major portion of the balancing strip 10 transversely thereof. The tire T and buffing member are adapted to move relative to one another circumferentially of the tire. Either the buffing member 20 may be moved with reference to the tire, or the tire may be rotated relative to the buffing member. In FIG. 6 the buffing member 20 and its driving shaft 21 are fixed and the tire T is being rotated or revolved relative to the buffing member in the direction of arrow X.

This buffing action is continued, at the heavy spot in the tire, until a sufficient amount of the balancing strip 10 has been removed to correct the out-of-balance condition of the tire. If, as indicated heretofore, the balancing strip 10 is of a color different from that of the adjacent tire wall, the exposure or partial exposure of the tire wall will act as a visual warning signal indicating that the buffing operation should be discontinued. In FIG. 6 the high gravity balance strip 10 is shown as having been buffed from the point A to the point B substantially to the liner 12. Inasmuch as the balancing strip 10 is made of relatively heavy material, it will ordinarily be unnecessary to buff the balancing strip entirely away at the heavy portion of the tire. However, as will be understood, the amount of buffing required, i.e., the depth and circumferential extent of the buffed area, depends upon the amount the tire is out of balance.

In FIGS. 7 and 8 a modification of the invention is illustrated. In this modification the high gravity balancing strip 10 is provided with a thin layer 10a of, for instance 10 gage stock of a color different from that of the balancing strip 10 to act as a visible warning signal to indicate when the high gravity strip has been buffed through and the inner surface of the tire is being approached by the buffing member.

For manufacturing convenience the warning strip 10a may be calendered onto the high gravity strip 10 and the resulting laminated stock may be applied to the building drum 11 as shown in FIG. 8, with the warning strip 10a on top. Thereafter, the inner liner, carcass plies and tread and sidewall portions may be applied to the building drum in the manner previously described.

Tires provided with high gravity balancing strips in accordance with this invention may be cured with a curing bag in a conventional mold such as illustrated in FIG. 9. As shown, the mold consists of two mold halves 22 and 23 provided with toe rings 24 and 25. The conventional curing bag 26 is inserted into the shaped tire carcass C which is then engaged in the mold cavity formed by the mold halves 22 and 23 and the toe rings 24 and 25. If it is found that there is a tendency for the pressure exerted by the curing bag 26 against the balancing strip 10 to displace the inner liner 12 or carcass stock, a curing bag such as shown in FIG. 10 may be employed. As noted, the curing bag 27 shown in FIG. 10 is provided with a shallow recess 28 extending circumferentially thereof in the crown region of the curing bag. This recess will accommodate the extra thickness of the balancing strip 10 and thus prevent undue pressure against the liner or carcass stock which might cause its displacement.

From the foregoing, it will be apparent that the present invention provides a simple and effective means for permanently balancing tires in an economical and expeditious manner. By making the balancing strip of a color different from the color of the adjacent tire wall or by the use of the visual warning strip, danger of cord exposure by reason of excess buffing is substantially eliminated. Also, with this invention tires may be balanced without changing or marring the outside appearance of the tire and the balancing strip may be used with equal facility in tubed and tubeless tires.

Having thus described our invention, what we claim and desire to protest by Letters Patent is:

1. In a method of balancing unbalanced tires the steps comprising, joining a balancing strip to the inner crown area of the tire throughout the circumference thereof, integrating said balancing strip and tire during vulcanization of the latter, locating are area causing the inbalance, and buffing off a portion of said balancing strip and said area to bring the tire into correct balance while leaving the remainder of the balancing strip intact.

2. A method as in claim 1 in which the balancing strip is formed of high gravity material.

3. A method as in claim 1 in which the balancing strip is built into the tire during fabrication of the latter.

4. A method as in claim 1 in which the balancing strip is formed of a colored material of a color different from that of the tire surface to which it is joined.

5. A method as in claim 1 in which a strip of colored material is interposed between the balancing strip and the inner crown surface of the tire, which when exposed acts as a visual warning signal to indicate excessive removal of the balancing strip.

6. A balanced pneumatic tubeless tire, comprising an unbalanced tire carcass characterized by being too heavy in one area, and a strip of elastomeric material containing a filler to augment its weight permanently bonded to the inner crown surface of said tire carcass, said strip being of substantially uniform width and extending circumferentially completely around said inner crown surface, said strip being of reduced thickness in said one area where said tire carcass is too heavy, the remainder of said strip being of substantially uniform thickness, whereby said strip and said tire carcass form a balanced tire.

7. A balanced pneumatic tubeless tire as in claim 6, in which said strip is of a color different from that of the surface of said tire carcass to which it is attached.

8. A balanced pneumatic tubeless tire as in claim 6, further comprising a thin layer of elastomeric material in between said strip and said inner crown surface of said tire carcass, said thin layer being of a color different from that of said strip.

References Cited in the file of this patent

UNITED STATES PATENTS

| | | |
|---|---|---|
| 2,193,734 | MacCracken | Mar. 12, 1940 |
| 2,245,355 | Mullen | June 10, 1941 |
| 2,429,032 | Sheahan | Oct. 14, 1947 |
| 2,476,884 | Maynard | July 19, 1949 |
| 2,566,384 | Tilton | Sept. 4, 1951 |
| 2,574,233 | Wolf | Nov. 6, 1951 |
| 2,874,746 | Nichols | Feb. 24, 1959 |

OTHER REFERENCES

New York Times, June 26, 1957, page 143, "New Tires Said to Have Permanent Built-in Balance."

UNITED STATES PATENT OFFICE
CERTIFICATE OF CORRECTION

Patent No. 3,048,211　　　　　　　　　　　　　　　　　August 7, 1962

George R. Cuthbertson et al.

It is hereby certified that error appears in the above numbered patent requiring correction and that the said Letters Patent should read as corrected below.

Column 4, line 67, for "are" read -- the --; same line 67, for "inbalance" read -- imbalance --; line 68, for "and", second occurrence, read -- at --; line 74, after "during" insert -- the --.

Signed and sealed this 4th day of December 1962.

(SEAL)
Attest:

ERNEST W. SWIDER
Attesting Officer

DAVID L. LADD
Commissioner of Patents